United States Patent [19]

Landoll et al.

[11] 4,361,191

[45] Nov. 30, 1982

[54] SEEDBED PREPARATION IMPLEMENT

[75] Inventors: Donald R. Landoll; David J. Kongs, both of Marysville, Kans.

[73] Assignee: Landoll Corporation, Marysville, Kans.

[21] Appl. No.: 238,765

[22] Filed: Feb. 27, 1981

[51] Int. Cl.³ .............................................. A01B 35/18
[52] U.S. Cl. ................................ 172/146; 172/151; 172/509; 172/200; 172/198; 172/552
[58] Field of Search ............... 172/177, 178, 552, 179, 172/180, 199, 146, 149, 151, 185, 186, 198, 200

[56] References Cited

U.S. PATENT DOCUMENTS

| | | | |
|---|---|---|---|
| 1,616,576 | 2/1927 | Iseley | 172/185 |
| 1,881,358 | 10/1932 | Hymans | 172/178 |
| 2,037,621 | 4/1936 | Dunham | 172/151 X |
| 2,673,434 | 3/1954 | Babinchak | 172/178 |
| 2,737,004 | 3/1956 | Archer | 172/691 |
| 3,757,871 | 9/1973 | Maust | 172/178 |
| 3,828,702 | 8/1974 | Bowman | 172/178 |
| 3,935,906 | 2/1976 | Neal | 172/177 |
| 3,991,831 | 11/1976 | Foster | 172/198 |
| 4,212,254 | 7/1980 | Zumbahlen | 172/777 |
| 4,313,503 | 2/1982 | Good | 172/140 |

Primary Examiner—Richard J. Johnson
Attorney, Agent, or Firm—Schmidt, Johnson, Hovey & Williams

[57] ABSTRACT

Through adaptation of and improvement upon secondary, minimum tillage techniques, there is provided a single pass, seedbed method and agricultural machine, utilizing reduction, incorporation, aeration and other procedures, capable of effectively handling all types of adverse field conditions, ground compositions and soil makeup in such manner as to quickly, easily and inexpensively convert all materials and substances therein contained or to be added thereto from a state generally unsuited for seeding and satisfactory plant development to a finished condition wherein any desired seed type may be thereupon planted, sowed or set thereinto without difficulty and with an assurance of good germination and strong, healthy crop growth unimpaired by wind and soil erosion, ineffective moisture retention and other impediments which otherwise normally reduce or destroy profitable harvesting results.

30 Claims, 18 Drawing Figures

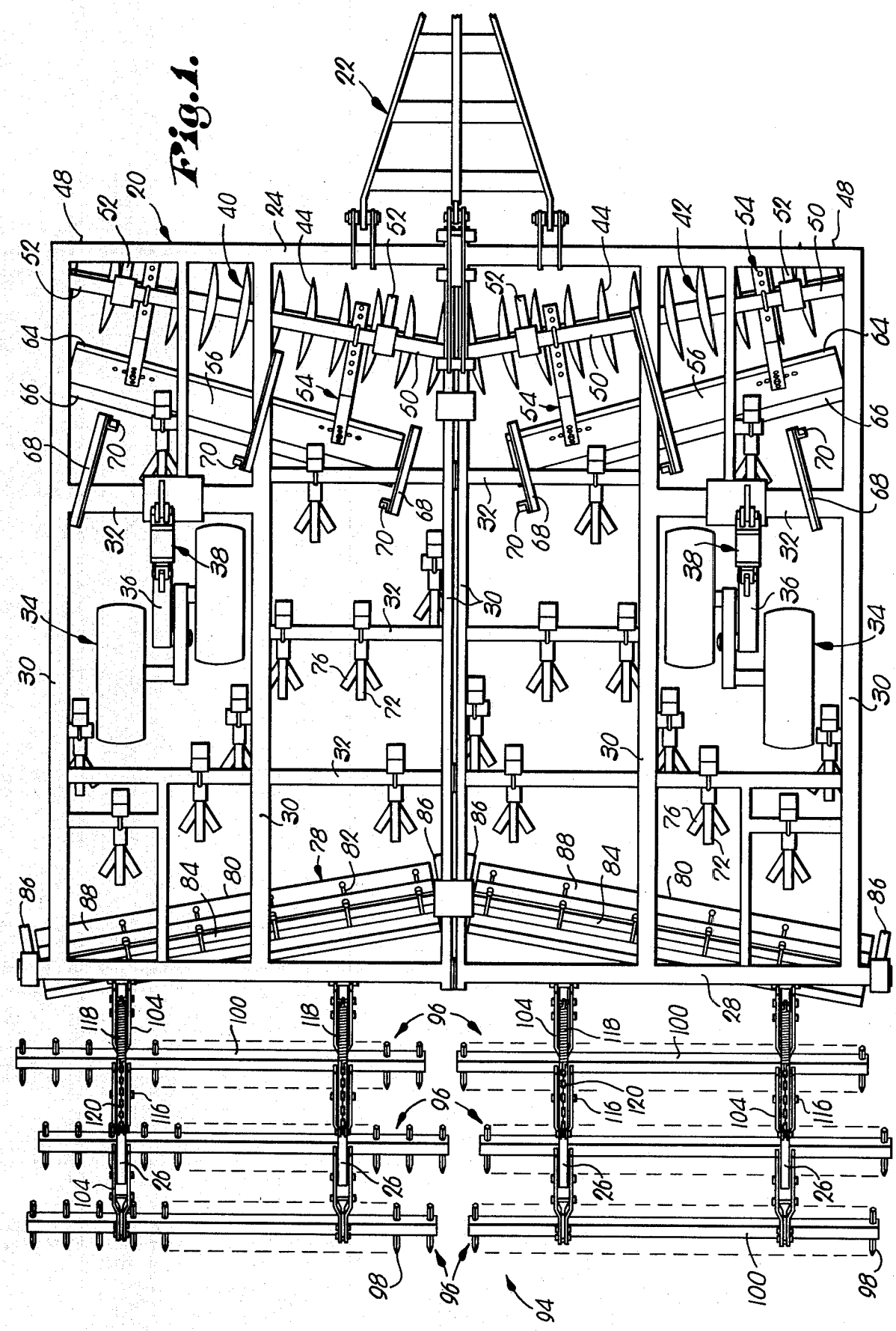

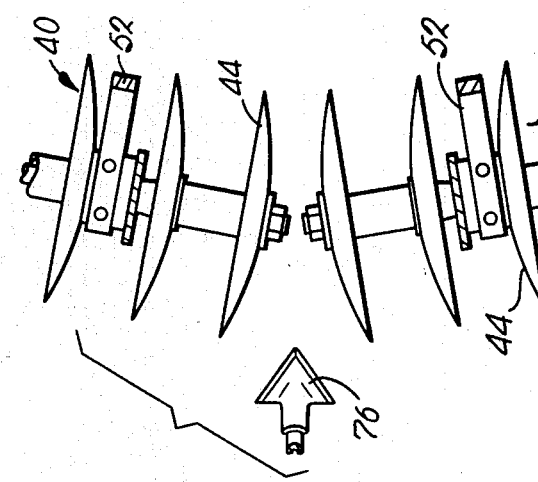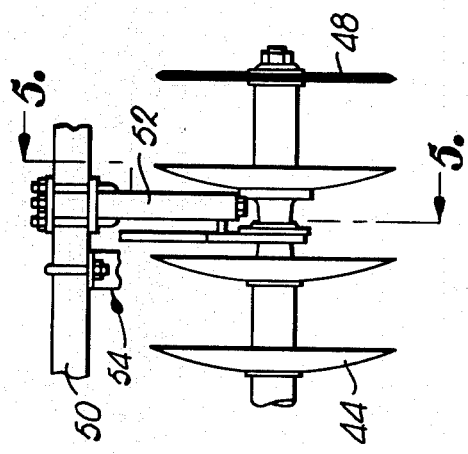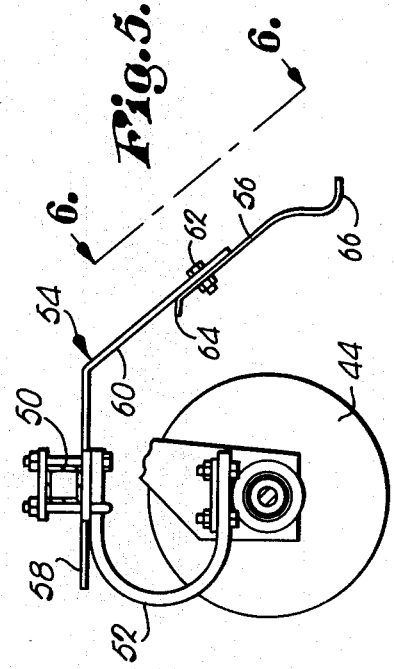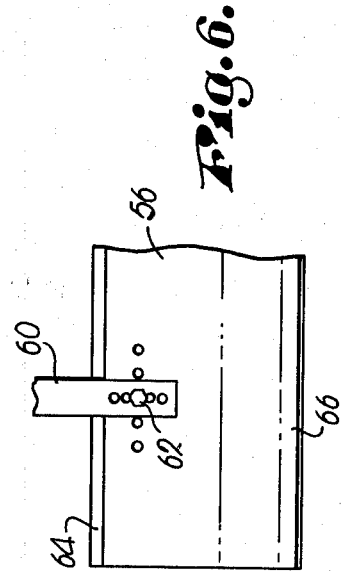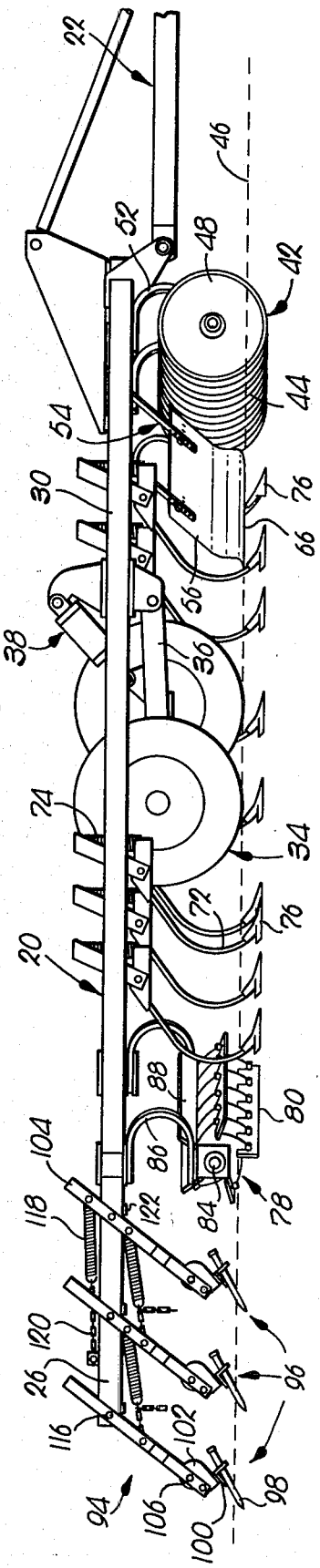

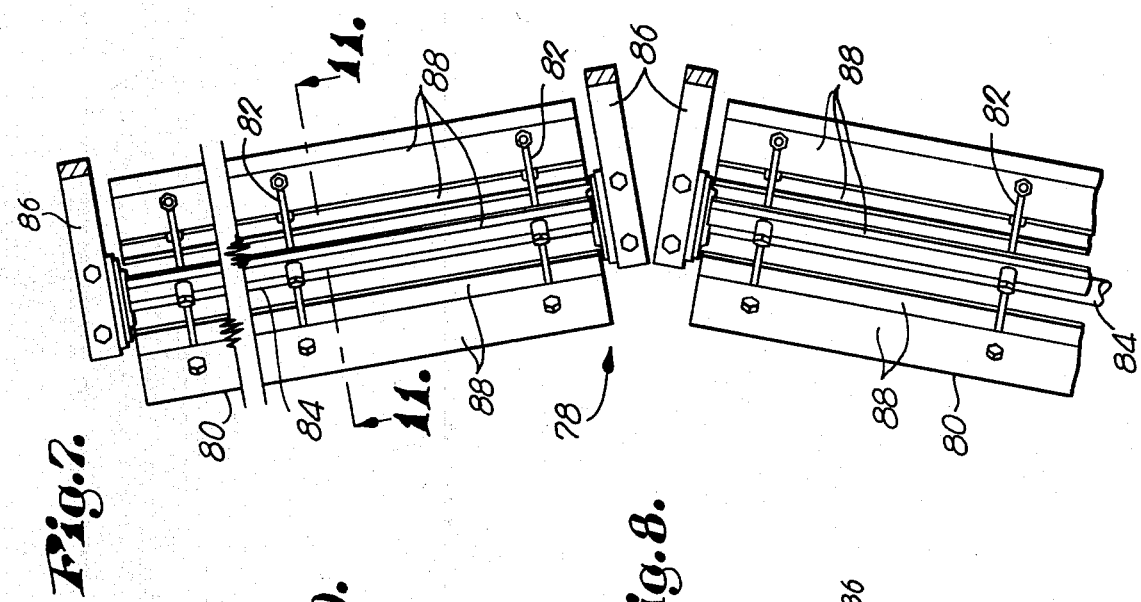
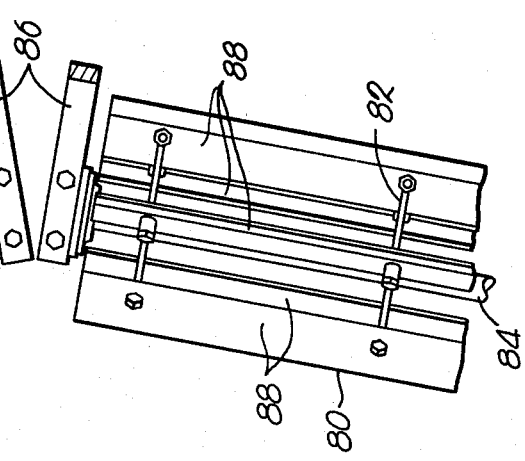
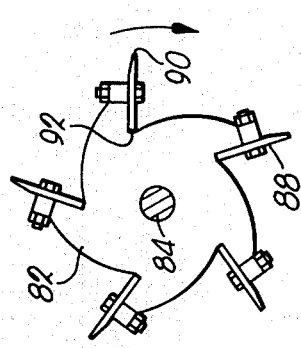
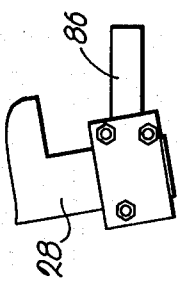
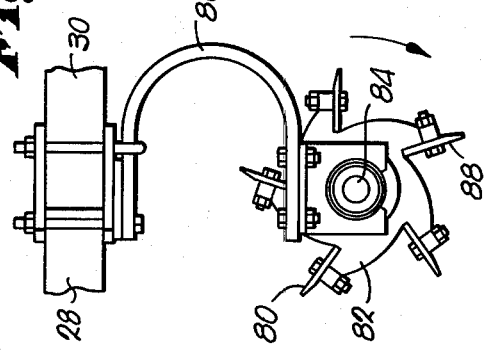
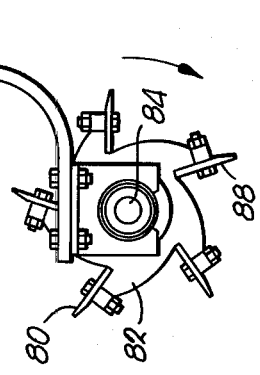
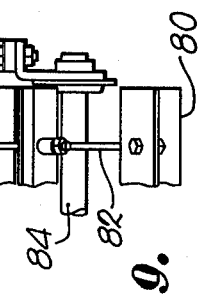
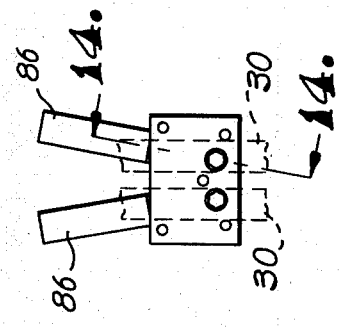
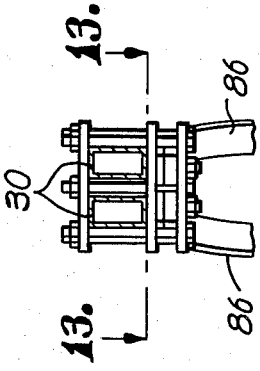

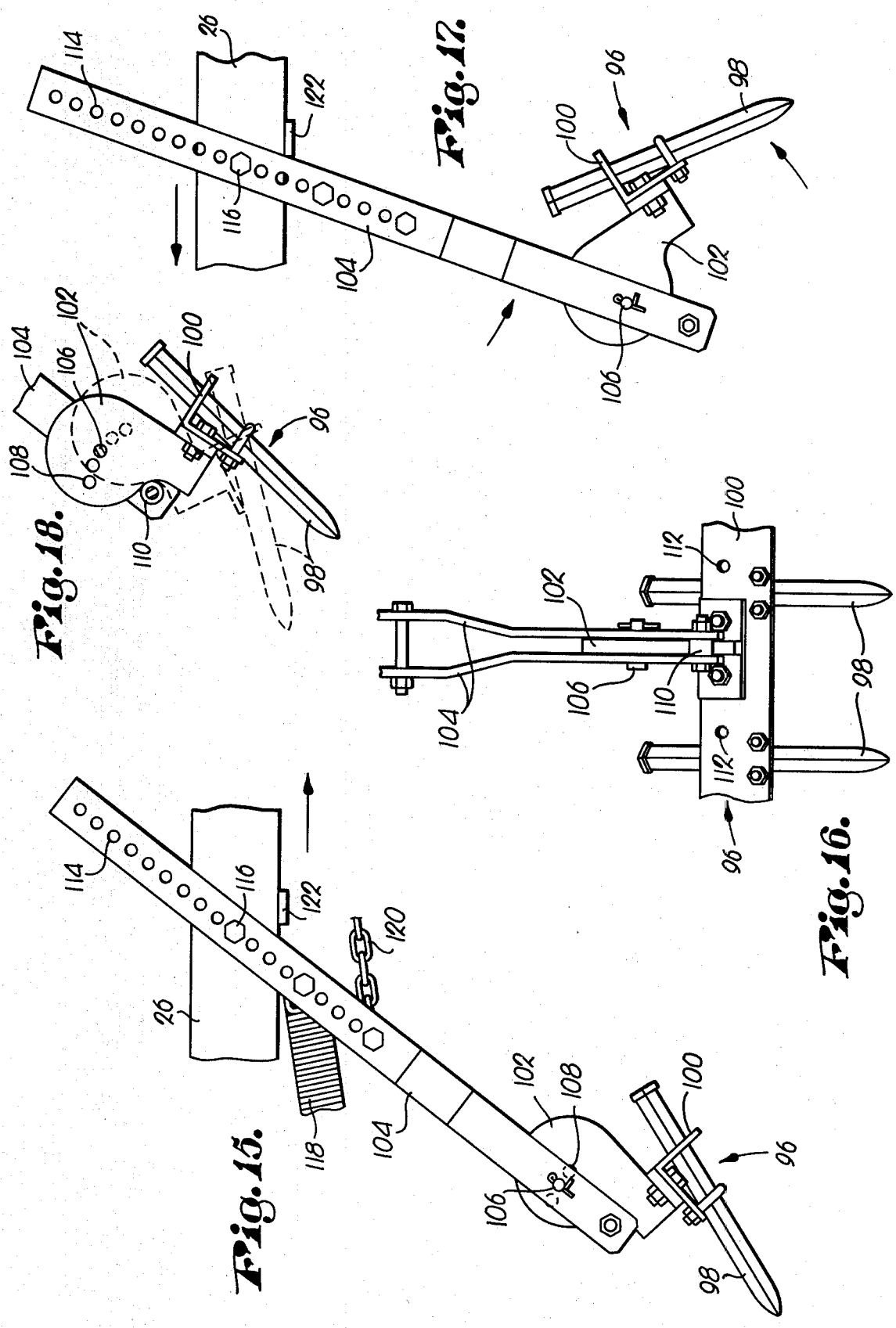

SEEDBED PREPARATION IMPLEMENT

The seedbed preparation system of our present invention, involving both the several, successive steps in the method of handling the ground materials and the implement for carrying out the method, is directed toward minimum tillage to prevent wind and soil erosion completed during but one trip through the field. To a large extent, the highly popular minimum tillage concepts in widespread use for soil conservation purposes, involve primary fall tillage and secondary springtime tillage during the seeding season. In each case, there is a strong tread toward single pass operations to avoid the time and expense of several trips through the field with a number of separate, costly implements each designed to attack the problem in a different manner in an effort to accomplish the final, single, end result, i.e. the ultimate production of a satisfactory seedbed.

Minimum tillage has resulted in the advent of numerous implement types, including basically the field cultivator and the chisel plow (with several kinds of optional shank assemblies and ground tools), together with improved disk, roller, drag and other harrows, rotary hoes, drag boards, choppers, mulch tillers, clod busters, spring tooth attachments, conditioners, spikes, flexible tines, cutters, reels, levelers, packers, and many additional tiller concepts with various numerous coined or generic names and titles. Manifestly, the cost of obtaining a full line of all or most of such equipment is usually somewhat impractical and beyond the financial capabilities of most farmers.

Accordingly, quite a large number of only partially successful suggestions have been introduced which combine two or more of the abovementioned implement types, arranged in tandem and usually supported by a common frame or carrier, such as a disk gang, cultivator and harrow or roller; a pair of choppers with an intervening chisel plow; a pair of cultivators with a cutter reel therebetween; a leveler, rotor, roller, seeder and chemical sprayer in successive order, etc. Oftentimes, leveling boards, mulching tines or rollers, press boards and/or choppers are tied on behind or interposed among other kinds of ground working devices.

There remains however, the provision of a satisfactory machine (with a related method of seedbed preparation) which (1) is universally adaptable for successful use in all kinds of field conditions, soils, crop residues, trash and mulches (2) prepares a seedbed suitable for receiving all types of seeds and seeding equipment (3) properly and fully handles and treats the materials for full reduction and incorporation purposes and (4) carries out a number of similar as well as distinctly different functions, each and all of which must be employed in proper order within uninterrupted time limitations in order to solve the problems and produce good end results.

Such is the object of our instant invention wherein several vertical, horizontal, lateral and rotative actions (both aggressive and gentle) are imparted to the ground materials until full breakdown and incorporation takes place so that the seedbed, made up of such materials, is ready for seeding. The successive steps provide for all requirements of crust breakage, weed, root and crop residue reduction; cutting, crushing and shattering of clods as well as elimination of hard, dense soils; mixing, stirring and blending to effect better incorporation; and softening, smoothing and leveling together with settling of fines.

In our machine for effecting the series of method steps, all equipment is suspended from a single carrier that is advanced through the field and set at preselected heights. All pieces or assemblies of equipment are arranged in close tandem relationship to preclude lapses in continuity. Each tillage and other ground handling tooling is structured to best treat the materials in the condition presented by the next preceding operation. And, in all respects, the entire combination of parts operates in conjunction and mutual dependency to produce the fully dressed seedbed automatically and without need for operator assistance or control.

In the drawings:

FIG. 1 is a top plan view of a seedbed preparation implement made according to our present invention and adaptable for carrying out our method of preparing seedbeds;

FIG. 2 is a side elevational view thereof;

FIG. 3 is an enlarged, fragmentary view of a portion of the disk gangs showing their relationship to a center cultivator sweep;

FIG. 4 is an enlarged, fragmentary elevational view of a portion of one of the disk gangs at its outer end;

FIG. 5 is a cross sectional view taken on line 5—5 of FIG. 4;

FIG. 6 is a fragmentary cross sectional view taken on line 6—6 of FIG. 5;

FIG. 7 is an enlarged, fragmentary plan view of the rotors shown in FIGS. 1 and 2;

FIG. 8 is an end view of one of the rotors;

FIG. 9 is a fragmentary, rear elevational view of a portion of one of the rotors;

FIG. 10 is a fragmentary, detailed, plan view showing one of the end attachments of one of the rotors to the carrier;

FIG. 11 is a cross sectional view taken on line 11—11 of FIG. 7;

FIG. 12 is a fragmentary, detailed rear elevational view showing the center attachment of the rotor to the carrier;

FIG. 13 is a cross sectional view taken on line 13—13 of FIG. 12;

FIG. 14 is a cross sectional view taken on line 14—14 of FIG. 13;

FIG. 15 is an enlarged, fragmentary side elevational view of one tooth assembly of the harrow and its support suspended from the carrier;

FIG. 16 is an enlarged, fragmentary rear elevational view of the assembly and support shown in FIG. 15;

FIG. 17 is a view similar to FIG. 15 showing the position of the parts during reverse movement of the implement; and FIG. 18 is a view similar to a portion of FIG. 15, parts being broken away from clearness.

A rectangular carrier 20 (FIGS. 1 and 2) having a tongue 22 attached to its front cross beam 24 and a number of fore and aft, laterally spaced frame pieces 26 extending rearwardly from its rear cross beam 28, has a number of spaced, longitudinal, frame members 30 interconnecting the beams 24 and 26, together with a plurality of spaced, transverse, frame elements 32 joining proximal members 30. The carrier 20 is supported just rearwardly of the beam 24 by two sets of tandem wheel units 34, swingably secured to one pair of the elements 32 by arms 36 controlled by hydraulic piston and cylinder assemblies 38 for varying the height of the carrier 20.

Two end-to-end gangs 40 and 42 of upright, rotatable, dish-shaped disks 44 adapted to roll and slice through the soil, penetrating beneath the level 46 of the ground as shown in FIG. 2, are located adjacent and immediately behind the beam 24, the outer disk 48 of each gang 40 and 42 being flat (see also FIG. 4). The gangs 40 and 42 are suspended from a number of oblique frame sections 50 forming a part of the carrier 20 through use of U-shaped, forwardly looped springs 52 for exerting a yieldable downward pressure on the disks 44 and 48 as best seen in FIG. 5, and the gangs 40 and 42 converge rearwardly toward the centerline of the machine (FIGS. 1 and 3) such that the disks 44 and 48 are disposed at an angle to the line of draft.

The concave surfaces of the disks 44 of the gang 40 face outwardly in one direction whereas the concave surfaces of the disks 44 of the gang 42 face outwardly in the opposite direction such that the materials being sliced are displaced outwardly toward the slicing disks 48, the latter serving to confine the materials within the bounds or expanse being worked by the gangs 40 and 42.

Also suspended from the sections 40, through use of brackets 54 having inverted "V" shapes, are a pair of elongated, transversely inclined panels 56 disposed immediately behind the gangs 40 and 42. The horizontal, longitudinal axes of the panels 56 are parallel with the axes of rotation of corresponding disks 44 and 48, but the distance between the proximal ends of the panels 56 is greater than the spacing between the inner end of the gangs 40 and 42.

Each of the horizontal legs 58 of the brackets 54 has a series of holes as seen in FIG. 1 for adjustment relative to the sections 50 to which they are clamped, and each of the downwardly and rearwardly inclined legs 60 (FIG. 5) of the brackets 54 has a series of holes, as seen in FIG. 6, for adjustment of the panels 56 relative to the legs 60. A series of holes is also provided in each panel 56 adjacent each leg 60 respectively (FIG. 6) for additional panel adjustment through use of releasable fasteners 62. Thus, the heights of the panels 56 relative to the carrier 20, the distance between the panels 56 and the fore and aft disposition of the panels 56 may be varied at will to accommodate for differing field conditions, soils and other factors.

Each panel 56 has an upper, longitudinal, forwardly extending, soil deflecting flange 64 and a lower, arcuate longitudinal, rearwardly extending, leveling lip 66.

Variously attached to certain of the members 30 and elements 32 are supports 68 for chemical applicators 70 (FIG. 1) such as liquid or granular herbicides or fertilizers, the tubular applicators 70 extending downwardly toward the ground level 46 directly behind the panels 56, and each of which may be provided with a spray nozzle or metering device (not shown) on or at its lowermost end.

Also following immediately behind the panels 56, and, therefore, for the most part, to the rear of the applicators 70, is a field cultivator capable of incorporating the chemicals and all crop residue, roots, weeds and the like previously reduced by the disks 44 and 48, into the soil, such as to provide a mulch acting as a deterrent to wind and water erosion. The cultivator comprises a number of transverse rows of rearwardly bowed spring shanks 72 connected to and suspended from the variety of elements 32 of the carrier 20.

The rearwardly swingable shanks 72 may be spring-loaded or cushioned by tension springs 74 and staggered as shown in FIG. 1. Each shank 72 has a ground working tool, preferably in the nature of a sweep 76 and, as noted in FIG. 3, one such sweep 76 (suspended from center members 30) is located at the centerline of the machine just adhead of the inner ends of the panels 56 and just behind the inner disks 44 to break up the soil not well treated and left as a ridge at the proximal ends of the gangs 40 and 42. Moreover, as seen in FIG. 1, certain sweeps 76 trail the units 34 to break up compaction by the wheel tracks.

While the disks 44 and 48 tend to slice down to the depth shown in FIG. 2, the ground therebetween is not loosened thereby to an extent sufficient for proper seedbed preparation; hence, the sweeps 76, which may be set at about the same depth, operate to slice forwardly and laterally along an essentially horizontal plane as they move forwardly through the soil, substantially finishing the break-up functions left incomplete and somewhat ridged by the disks 44 and 48. As a result, the sweeps 76 leave an essentially flat, undisturbed plane below the soil mixture being further stirred and mixed by the sweeps 76 subsequent to smoothing by the lip 66 of the panels 56 and after deposit of chemicals by the applicators 70.

At this juncture then, the materials above such plane will have been sufficiently reduced, loosened and incorporated as to be capable of receiving further treatment of the kind produced by a rotor assembly 78 suspended from the carrier 20 immediately behind the rearmost row of sweeps 76 (FIGS. 1 and 2). As detailed in FIGS. 7-14, the assembly 78 includes a pair of identical rotors 80 capable of rolling freely through the materials loosened by the sweeps 76 and arranged to converge forwardly as the centerline of the machine is approached (FIGS. 1 and 7).

Of special note then is the fact that within the seedbed preparation method of our present invention are the steps of also shifting the materials laterally, first in opposite directions outwardly by the disks 44, then in opposite directions inwardly by the rigid panels 56 and thereafter, once again, in opposite directions inwardly by the obliquely arranged rotors 80. This added feature lends itself admirably to the kind of most desirable seedbed needed and universally accepted in present day minimum tillage-seeding operations.

Each rotor 80 has a number of notched spiders 82 (FIG. 11) secured to and spaced along a shaft 84 rotatably carried by forwardly bowed springs 86 that are, in turn, suspended from the beam 28 and the two center members 30 (FIGS. 9, 10 and 12-14). Releasably secured to the spiders 82 within each of their notices is an elongated, flat, straight bar 88 having its longitudinal axis parallel with the axis of rotation of the shaft 84. The chord-like disposition of the transverse axes of the bars 88 presents a leading, outer, longitudinal edge 90 and a trailing, inner longitudinal edge 92 (FIG. 11).

The rotors 80, set at about the depth shown in FIG. 2, above but adjacent the subsurface plane created by the sweeps 76, thoroughly mix the materials previously dislodged and broken up, and operate to further reduce most of the fragments to a relatively fine condition, furthering the action of the sweeps 76 which cause the fines to settle while leaving a roughage nearer and along the top surface capable of absorbing rains and deterring erosion by winds and water.

The materials are now in condition for permitting the successful and immediate, final finishing step of placing the seedbed in shape for seeding. It involves the use of a drag harrow 94 suspended from the frame pieces 26 directly behind the assembly 78 (FIGS. 1 and 2). The harrow 94 had two identical sections 96 and each section 96 is provided with three, parallel, transverse rows of inclined, laterally spaced, parallel, spike teeth 98. As seen in FIG. 1, the rows are end-to-end with equal spacings therebetween, arranged to stagger the teeth 98 and thereby effect full coverage.

The teeth 98 are releasably clamped to six, identical, interchangeable, elongated angles 100 (FIGS. 15-18) that are, in turn, detachably mounted on a pair of swingable hangers 102, and each hanger 102 is mounted on a corresponding, inclined support arm 104 by a removable pivot pin 106 transversing its hanger 102 and the bifurcations at the lower end of arm 104 between which the hanger 102 is disposed. Each hanger 102 has a number of holes 108 (FIGS. 15 and 18) for receiving the pin 106 to permit adjustment of the angles of incline of the teeth 98 and a stop sleeve 110 (FIGS. 16 and 18) limits the extent of swinging movement of the hanger 102 about the pin 106 in response to the load on the teeth 98 by the soil being traversed during forward movement of the machine. The positions of the angles 100 relative to the hangers 102 may be changed by virtue of a number of fastener-receiving openings 112 (FIG. 16) in the angles 100 to thereby vary the positions of the angles 100 relative to each other and to their hangers 102.

Each arm 104 has a series of apertures 114, any one of which may be used to receive a pivot bolt 116 passing through the frame piece 26, to vary the height of the harrow 94; and those apertures 114 are also employed to connect springs 118 as well as chains 120 to the arms 114, the springs 118 serving to yieldably bias the teeth 98 forwardly and downwardly toward the surface left by the sweeps 76, and into the materials themselves, as seen in FIG. 2.

Each spring 118 has a corresponding chain 120 at one of its ends and each spring 118 has its opposite end connected to a corresponding arm 104, the chains 120 permitting adjustments by virtue of their several links. The top chains 120 are attached to proximal pieces 26 whereas the lower chains 120 connect with arms 104 next behind as is clear in FIG. 2.

During any movement of the machine tending to cause rearward movement of the frame pieces 26, as illustrated by the arrow in FIG. 17, the hangers 102 will swing away from the sleeves 110 and the arms 104 will swing against the action of their springs 118 until they engage stops 122 on the frame pieces 26, thereby avoiding damage to the components of the harrow 94.

OPERATION

It can now be appreciated that all five tools (gangs 40 and 42, panels 56, cultivator sweeps 76, rotor assembly 78 and harrow 94) function in their individualistic manners to both reduce the materials in the ground first confronted by the disks 44 and 48 and to incorporate those materials into a well mixed seedbed mass, with the chemicals also distributed evenly throughout the mass prior to completion of the operation by the harrow 94. In addition, while the materials are raised by the gangs 40 and 42, the sweeps 76 and the rotors 80, they are also firmed back down and leveled by the actions of the panels 56 and the harrow 94, with the fines settled out during treatment by the sweeps 76, the rotors 80 and the harrow 94 until the latter has completed its function of further stirring, incorporation, firming and presentation of a clod-free, level admixture, devoid of air pockets and ready for trouble-free traverse by seeders, drills, planters and the like.

Not to be overlooked is the fact that each of the five successive treatments takes place without interruption while the materials are still in the condition presented by the next previous operation. That is to say, there are no time delays between steps such as would permit return of the materials to an original condition. If, for example, the sweeps 76 were employed at a later time when the effects of the gangs 40 and 42 had changed by settling, rains, winds and other factors, the sweeps 76 would be appreciably less effective in accomplishing their intended functions and results above explained.

As a matter of fact, for example, it is not uncommon to find that fields must be disked more than once because of intervening factors before continuing with additional passes and differing types of tools in an effort to ultimately come up with a proper seedbed. Here we have, on the other hand, each step being dependent upon and being carefully selected in strict accordance with the nature and unchanged results of the preceding step or steps such that all of the various actions of each of the five tools combine and contribute in mutual interdependency, and with all being necessary in proper order to accomplish the production of the type of seedbed most desirably presented.

Not without significance also is the way the panels 56 contribute to proper chemical incorporation by settling down of the materials, smoothing the surface and protecting the flow pattern by virtue of interpositioning between the gangs 40,42 and the applicators 70. Moreover, the specific natures of the rotor assembly 78 and the harrow 94 are highly important because, regardless of the extent to which the rotors 80 churn, stir and raise the materials, the teeth 98 bring them back down into a composite, uniform mixture of proper porosity and density throughout the entire mass.

While the diameters of the disks 44,48 and of the rotors 80 are not critical, good results have been attained by use of 20" disks and 16" rotors. It has been found that if the disks are too small they tend to push or bulldoze the materials forwardly rather than cut through and into the materials as desired. Moreover, it has been determined that if the rotors 80 are too small, they do not handle the materials as well, in the manner above described. Best results are produced if the rotors 80 rotate rather rapidly as they roll along such as to augment incorporation and move the materials inwardly toward the fore and aft centerline of the machine.

It is to also be understood that the good results above outlined do not require use of the applicators 70. All other components of the machine, including the panels 56, will still operate satisfactorily and provide a better seedbed than has heretofore been possible. Furthermore, the applicators 70 could be located ahead of the gangs 40,42 if one should so desire, depending on field conditions, perhaps detracting somewhat from good end results, but still achieving many advantages not heretofore suggested or made possible. Care must be exercised, however, in relocating the applicators 70 because many substances to be dispensed should not be concentrated such as to create "hot spots" having adverse effects upon seed germination and growth. For example, if the applicators 70 were located ahead of the panels 56, some chemicals might be deposited deeper than is desired and the flow pattern could be adversely effected by the materials being thrown up by the gangs 40 and 42.

We claim:

1. In a secondary, one trip, minimum tillage, seedbed preparation machine for use during the seeding season,
   a carrier;
   a plurality of soil penetrating, incorporating slicer disks suspended from the carrier for breaking crusts, reducing crop residue, roots, clods and compaction, and for leveling ridges and other ground surface irregularities;
   shielding suspended from the carrier immediately behind the disks for controlling the flow of materials brought up by the disks and leveling the same;
   a number of rows of spaced, field cultivator, incorporating blades suspended from the carrier immediately behind the shielding for further reducing compaction and for loosening and aerating the materials sliced by said disks;
   rotatable, soil agitating, incorporating reel structure suspended from the carrier immediately behind the blades and adapted to freely roll through said materials for churning, stirring and pulverizing the same to lower the fines to seedbed level and raise the roughage to the top for effecting moisture retention and conservation; and
   a multiplicity of incorporating teeth suspended from the carrier immediately behind the reel structure for harrowing, smoothing, further leveling, settling and firming the materials pulverized by the reel structure to complete the dressing of the seedbed.

2. The invention of claim 1; and an applicator suspended from the carrier immediately behind the shielding for depositing a soil treating substance onto the surface leveled by the shielding and incorporation with said materials by the blades, reel structure and teeth.

3. The invention of claim 2, said shielding being disposed relative to the applicator to preclude breakage of the pattern of said substances being deposited onto said surface.

4. The invention of claim 1, said discs, blades, reel structure and teeth being spring-loaded.

5. The invention of claim 1, there being two, spring-loaded gangs of rotatable, upright, dish-shaped disks adapted to freely roll through the soil, said gangs converging rearwardly toward the centerline of said machine, disposing the disks at an angle to the line of draft.

6. The invention of claim 5, each gang having an outer, rotatable, upright, flat, cutter disk for preventing lateral displacement of said materials outwardly beyond the expanse penetrated by the disks.

7. The invention of claim 1, said shielding including a pair of elongated, downwardly and rearwardly sloping panels converging rearwardly toward the centerline of said machine.

8. The invention of claim 7, each panel having an upper, longitudinal, forwardly projecting, soil-deflecting flange.

9. The invention of claim 7, each panel having a lower, longitudinal, rearwardly projecting, leveling lip.

10. The invention of claim 7; and an applicator suspended from the carrier and disposed to discharge soil treatment substances immediately behind the panels at a level below the upper longitudinal edges of the panels for incorporation with said materials by the blades, reel structure and teeth.

11. The invention of claim 1, each blade comprising a spring-loaded sweep for producing a substantially flat, even, essentially undisturbed, subsurface table beneath the seedbed.

12. The invention of claim 1, said reel structure including a pair of spring-loaded rotors converging forwardly toward the centerline of said machine.

13. The invention of claim 1, said reel structure including a series of flat, straight, elongated, parallel, circumferentially spaced bars surrounding the axis of rotation of the reel structure.

14. The invention of claim 13, each bar having a chord-like, transverse, inward angle, presenting a leading, outermost, longitudinal edge and a trailing, innermost, longitudinal edge.

15. The invention of claim 1, there being a pair of end-to-end drag harrow sections suspended from the carrier, each provided with a number of transverse rows of inclined, laterally spaced, spike teeth, said rows being spaced apart fore and aft of the machine.

16. The invention of claim 1, there being an assembly of inclined, laterally spaced, harrowing teeth arranged in a row extending transversely of the machine, inclined support means for said assembly extending upwardly and forwardly from the assembly, and pivot means attaching the support means to the carrier for swinging movement of the support means fore and aft of the machine relative to the carrier.

17. The invention of claim 16, and resilient means associated with said support means for yieldably biasing the teeth forwardly and downwardly into the pulverized soil.

18. The invention of claim 16, said support means having means associated with said pivot means for varying the depth of penetration of the teeth into the soil.

19. The invention of claim 16, said assembly and said support means having means for varying the inclination of said teeth.

20. The invention of claim 16, said assembly being pivotally connected to the support means for swinging movement of the assembly fore and aft of the machine relative to the support means.

21. A secondary, one trip, minimum tillage method of seedbed preparation during the seeding season, said method including the steps of:
   continuously slicing the soil to break crusts, reduce crop residue, roots, clods and compaction, to level ridges and other ground surface irregularities and to incorporate the materials so sliced;
   thereupon, immediately and without interruption, continuously confining the flow of said materials brought up during slicing within predetermined bounds while simultaneously leveling the same;
   then, immediately and without interruption, continuously cultivating the leveled soil so confined to further reduce compaction and to loosen, aerate and further incorporate the sliced materials;
   thereafter, immediately and without interruption, continuously churning, stirring and pulverizing the cultivated materials to lower the fines to seedbed level and raise the roughage to the top for effecting moisture retention and conservation; and
   then, as the final step, immediately and without interruption, continuously harrowing the pulverized materials to further incorporate and level the same, to settle and firm the materials and to thereby complete the dressing of the seedbed.

22. The invention of claim 21; and immediately prior to cultivating the materials leveled during the confining step, immediately and continuously depositing a soil treatment substance onto the surface so leveled for incorporation by each of the successive steps next following.

23. The invention of claim 22 wherein said confining step includes the simultaneous step of shielding the materials brought up during the slicing step against flow into the path of said substance being deposited onto said surface.

24. The invention of claim 21 wherein said slicing step includes the simultaneous step of confining the materials within predetermined bounds as the same are being brought up during the slicing step.

25. The invention of claim 21 wherein the materials are displaced outwardly in opposite directions during the slicing step.

26. The invention of claim 21 wherein the materials brought up during the slicing step are displaced inwardly from opposite directions during the confining and simultaneous leveling step.

27. The invention of claim 21 wherein the cultivated materials are displaced inwardly in opposite directions during the churning, stirring and pulverizing step.

28. The invention of claim 21 wherein the cultivating step includes the simultaneous step of producing a substantially flat, even, essentially undisturbed, subsurface table beneath the seedbed.

29. The invention of claim 21 wherein the harrowing step includes a number of successive soil penetrating steps accompanied by a dragging operation.

30. The invention of claim 21 wherein a yieldable downward ground pressure is exerted during the slicing, cultivating and harrowing steps and during the churning, stirring and pulverizing step.

* * * * *